(12) United States Patent
Zhang et al.

(10) Patent No.: US 10,198,594 B2
(45) Date of Patent: Feb. 5, 2019

(54) METHOD AND DEVICE FOR DISPLAYING NOTIFICATION INFORMATION

(71) Applicant: Xiaomi Inc., Beijing (CN)

(72) Inventors: Bo Zhang, Beijing (CN); Ruijun Xu, Beijing (CN); Zhenwei Wen, Beijing (CN)

(73) Assignee: Xiaomi Inc., Beijing (CN)

( * ) Notice: Subject to any disclaimer, the term of this patent is extended or adjusted under 35 U.S.C. 154(b) by 25 days.

(21) Appl. No.: 14/933,329

(22) Filed: Nov. 5, 2015

(65) Prior Publication Data

US 2016/0192324 A1 Jun. 30, 2016

Related U.S. Application Data

(63) Continuation of application No. PCT/CN2015/077881, filed on Apr. 29, 2015.

(30) Foreign Application Priority Data

Dec. 30, 2014 (CN) .......................... 2014 1 0851129

(51) Int. Cl.
*G06F 21/62* (2013.01)
*H04L 29/06* (2006.01)
(Continued)

(52) U.S. Cl.
CPC ...... *G06F 21/6245* (2013.01); *H04L 63/0861* (2013.01); *H04W 12/02* (2013.01); *G06F 2221/032* (2013.01); *H04W 12/06* (2013.01)

(58) Field of Classification Search
CPC .... G06F 3/0483; G06F 3/04883; G06F 21/31; G06F 21/61; G06F 21/6218;
(Continued)

(56) References Cited

U.S. PATENT DOCUMENTS

| 8,910,299 B2 * | 12/2014 | Michalske | .............. H04W 4/90 726/27 |
| 2005/0221798 A1 * | 10/2005 | Sengupta | ................ H04M 1/67 455/411 |

(Continued)

FOREIGN PATENT DOCUMENTS

| CN | 103577594 A | 2/2014 |
| CN | 103647587 A | 3/2014 |

(Continued)

OTHER PUBLICATIONS

International Search Report of PCT Application No. PCT/CN2015/077881, from the State Intellectual Property Office of China, dated Oct. 9, 2015 (4 pages).

(Continued)

*Primary Examiner* — Magdi Elhag
(74) *Attorney, Agent, or Firm* — Finnegan, Henderson, Farabow, Garrett & Dunner LLP

(57) ABSTRACT

A method for displaying notification information on an electronic device is disclosed. The method includes: receiving notification information in a lockscreen state; determining a user type of a user to view the notification information; determining a display mode of the notification information according to the user type; and displaying the notification information on the electronic device according to the display mode.

5 Claims, 8 Drawing Sheets

(51) Int. Cl.
*H04W 12/02* (2009.01)
*H04W 12/06* (2009.01)

(58) Field of Classification Search
CPC .......... G06F 21/6245; H04L 63/0861; H04W 12/08; H04W 12/02
See application file for complete search history.

(56) References Cited

U.S. PATENT DOCUMENTS

| | | | |
|---|---|---|---|
| 2013/0191911 | A1 | 7/2013 | Dellinger et al. |
| 2014/0085460 | A1 | 3/2014 | Park et al. |
| 2014/0101768 | A1* | 4/2014 | Miller ............... G06F 21/51 726/25 |
| 2014/0106711 | A1 | 4/2014 | Seo et al. |
| 2014/0223542 | A1 | 8/2014 | Hicks et al. |
| 2014/0273967 | A1 | 9/2014 | Kwon et al. |
| 2014/0351914 | A1 | 11/2014 | Suresh et al. |
| 2014/0372896 | A1 | 12/2014 | Raman |
| 2015/0074615 | A1* | 3/2015 | Han ............... G06K 9/00033 715/863 |
| 2015/0087266 | A1* | 3/2015 | Nakazawa ........... G06F 3/0483 455/411 |

FOREIGN PATENT DOCUMENTS

| | | |
|---|---|---|
| CN | 103699825 A | 4/2014 |
| CN | 103826011 A | 5/2014 |
| CN | 104052868 A | 9/2014 |
| CN | 104159218 A | 11/2014 |
| EP | 2 219 105 A1 | 2/2009 |
| EP | 2713298 A1 | 4/2014 |
| EP | 2779711 A1 | 9/2014 |
| JP | 02-067668 A | 3/1990 |
| JP | 2005-341187 A | 12/2005 |
| JP | 2011053925 A | 3/2011 |
| KR | 2000-0042952 A | 7/2000 |
| KR | 10-2014-0008210 A | 1/2014 |
| KR | 10-2014-0047188 A | 4/2014 |
| RU | 2013 103 430 A | 8/2014 |
| WO | WO 2007/074596 A1 | 7/2007 |
| WO | WO 2012/177391 A2 | 12/2012 |
| WO | WO 2013/133007 A1 | 9/2013 |
| WO | WO 2016/107030 A1 | 7/2016 |

OTHER PUBLICATIONS

Extended Search Report for European Application No. 15 20 2982 dated May 25, 2016.
Russian Office Action for Russian Application No. 2015127802/07 dated Feb. 2, 2016.
English version of International Search Report for International Application No. PCT/CN2015/077881 dated Oct. 9, 2015.
Sun D. et al., Android Mobile Phone Using Tips, Chapter 4.2.2: Face Unlocking, dated May 31, 2013.

* cited by examiner

METHOD AND DEVICE FOR DISPLAYING NOTIFICATION INFORMATION

CROSS-REFERENCE TO RELATED APPLICATIONS

This application is a continuation of International Application No. PCT/CN2015/077881, filed Apr. 29, 2015, which is based upon and claims priority to Chinese Patent Application No. 201410851129.3, filed Dec. 30, 2014, the entire contents of all of which are incorporated herein by reference.

TECHNICAL FIELD

The present disclosure relates to the field of communication technologies and, more particularly, to a method and a device for displaying notification information.

BACKGROUND

To provide convenience to users, conventional electronic devices are configured to display various notification information, such as short messages and instant communication information, while screens of the devices are locked in a lockscreen state. However, the notification information may be revealed to people other than the owner of an electronic device, who may also see such notification information in the lockscreen state.

To prevent the notification information from leakage, the electronic device may allow the user to set a display mode of the notification information in the lockscreen state according to the user's need. For instance, the display modes can include displaying contents of the notification information or only the prompt that the notification information is received, or not displaying the notification information at all.

SUMMARY

According to a first aspect of the present disclosure, there is provided a method for displaying notification information on an electronic device. The method includes: receiving notification information in a lockscreen state; determining a user type of a user to view the notification information; determining a display mode of the notification information according to the user type; and displaying the notification information on the electronic device according to the display mode.

According to another aspect of the present disclosure, there is provided a device for displaying notification information. The device includes a processor and a memory for storing instructions executable by the processor. The processor is configured to: receive notification information when the device is in a lockscreen state; determine a user type of a user to view the notification information; determine a display mode of the notification information according to the user type; and display the notification information on the device according to the display mode.

According to yet another aspect of the present disclosure, there is provided a non-transitory computer-readable storage medium storing instructions which, when executed by a processor of an electronic device, cause the electronic device to perform: receiving notification information in a lockscreen state; determining a user type of a user to view the notification information; determining a display mode of the notification information according to the user type; and displaying the notification information on the electronic device according to the display mode.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1A:
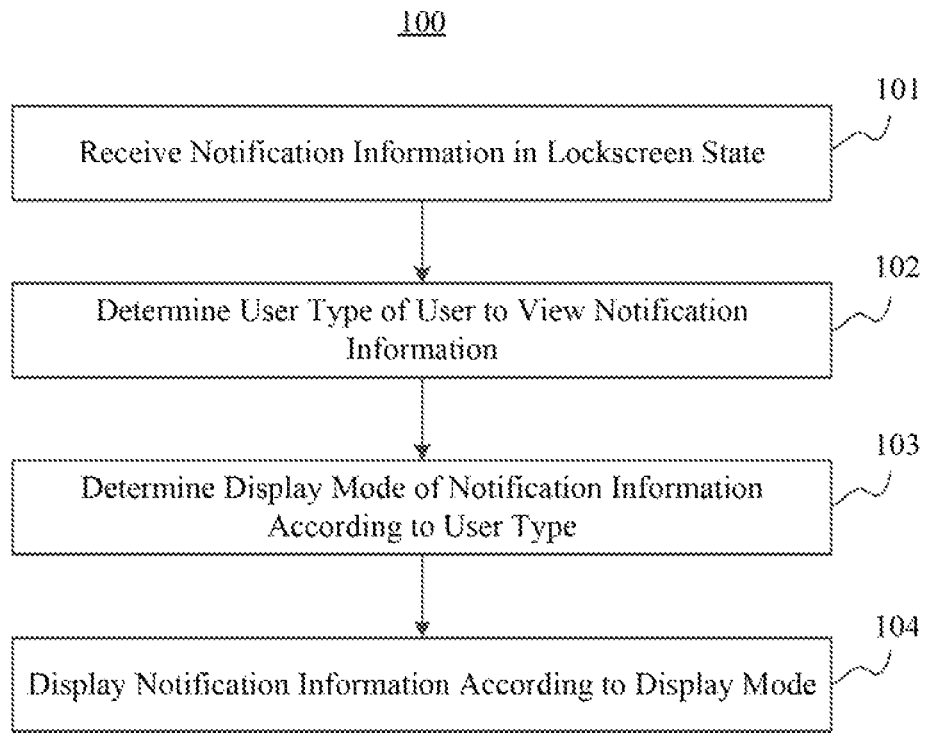
FIG. 1A is a flow chart of a method for displaying notification information according to an exemplary embodiment.

FIG. 1A is a flow chart of a method 100 for displaying notification information, according to an exemplary embodiment. For example, the method 100 can be performed by an electronic device, such as a smartphone, a tablet, a smart TV, an e-book reader, a multimedia player, a portable laptop computer, a desktop computer, and the like. Referring to FIG. 1A, the method 100 includes the following steps.

In step 101, notification information is received in a lockscreen state.

In step 102, a user type of a user to view the notification information is determined.

In step 103, a display mode of the notification information is determined according to the user type.

In step 104, the notification information is displayed according to the display mode.

Figure 1B:
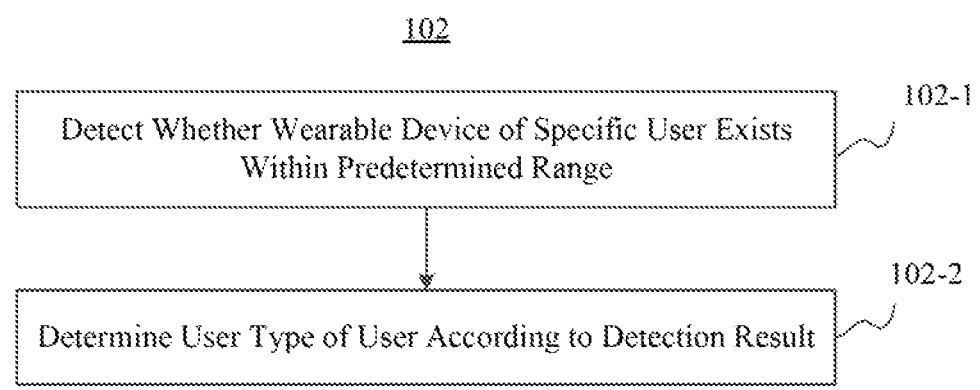
FIG. 1B is a flow chart of a method for determining a user type of a user, according to an exemplary embodiment.

In some embodiments, determining a user type of a user to view the notification information includes the following steps as shown in FIG. 1B. In step 102-1, it is detected whether a wearable device of a specific user exists within a predetermined range from the electronic device. In step 102-2, the user type of the user to view the notification information is determined according to the detection result. For example, users of the electronic device can be divided into a first type including specific users and a second type including non-specific users. A specific user can be a user who has the authority to view private information, and a non-specific user can be a user who does not have the authority to view private information.

Figure 1C:
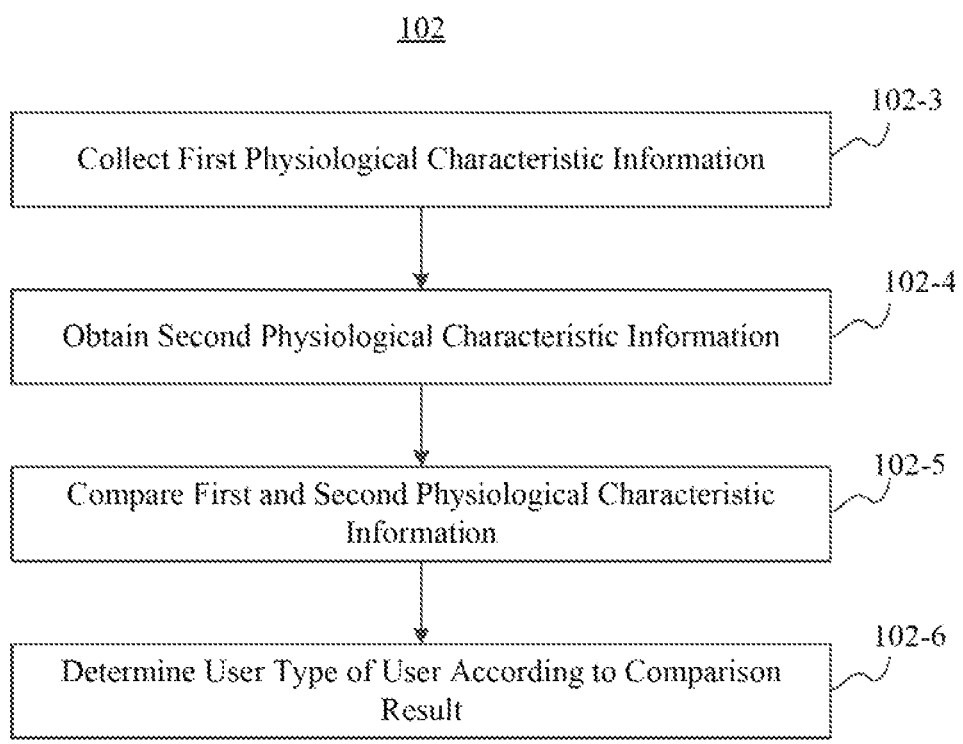
FIG. 1C is a flow chart of a method for determining a user type of a user, according to an exemplary embodiment.

In other embodiments, determining a user type of a user to view the notification information includes the following steps as shown in FIG. 1C. In step 102-3, first physiological characteristic information of a user who is using the electronic device is collected. In step 102-4, obtaining pre-stored second physiological characteristic information of the user is obtained. In step 102-5, the first physiological characteristic information is compared with the second physiological characteristic information. In step 102-6, the user type of the user to view the notification information is determined according to the comparison result.

Figure 2A:
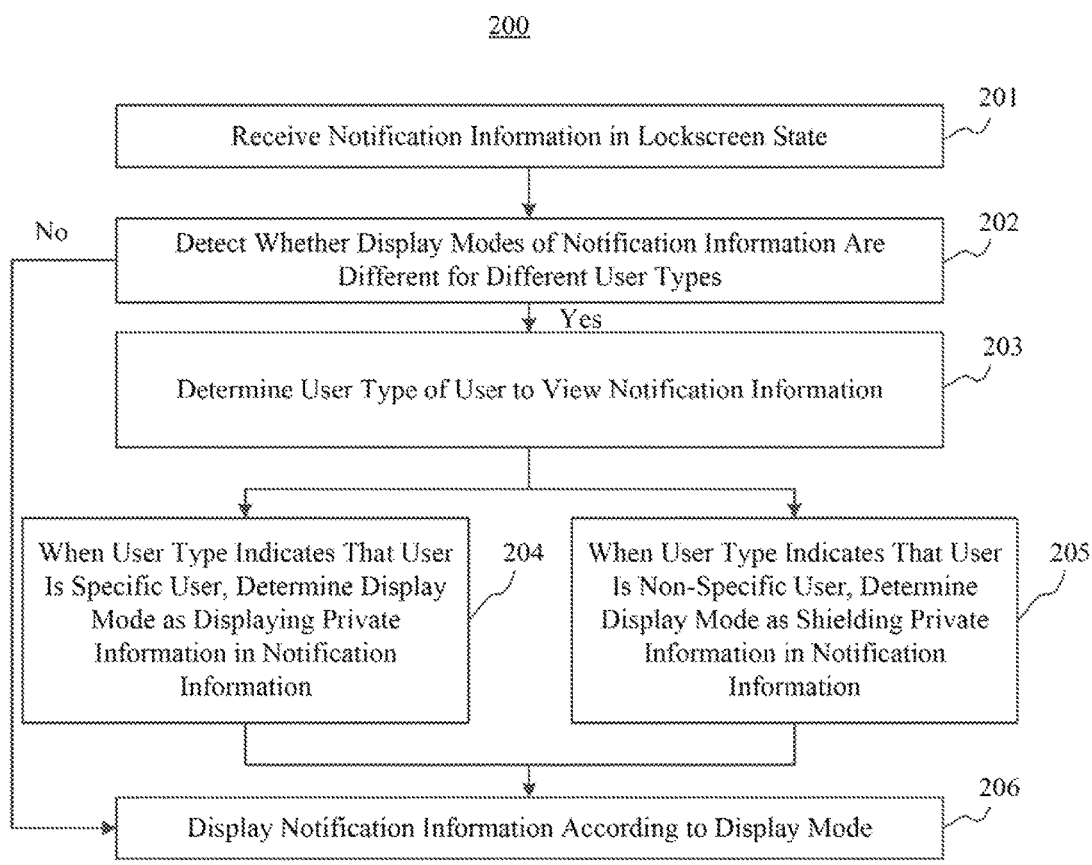
FIG. 2A is a flow chart of a method for displaying notification information, according to an exemplary embodiment.

FIG. 2A is a flow chart of a method 200 for displaying notification information, according to an exemplary embodiment. For example, the method 200 may be performed by an electronic device, such as a smartphone, a tablet, a smart TV, an e-book reader, a multimedia player, a portable laptop computer, a desktop computer, and the like. Referring to FIG. 2A, the method 200 includes the following steps.

In step 201, notification information is received in a lockscreen state.

For example, the lockscreen state is a state in which the screen of the electronic device is locked. In some embodiments, the lockscreen state cannot be released unless the electronic device receives an unlock instruction.

Also for example, the notification information can be information received by the electronic device in a state when the screen is off and locked. In some embodiments, the user may set a display mode of the notification information. For instance, after the notification information is received, a first mode is that the screen is turned on and the entire contents of the notification information are displayed in a lockscreen interface. A second mode is that the screen is turned on and a prompt regarding the notification information is displayed in the lockscreen interface. After the user unlocks the screen, the entire contents of the notification information are then displayed. The notification information may be short messages, instant communication information, emails, push information, and the like received by the electronic device.

In step 202, whether display modes of the notification information are different for different user types is detected.

In some embodiments, the electronic device may be used by a plurality of specific users, and these specific users form a specific user group. The specific user group may include an owner of the electronic device and other specific users set by the owner. For instance, the owner of the electronic device may set family members as the specific users of the electronic device, so that the specific user group of the electronic device includes the owner and the family members of the owner.

In exemplary embodiments, the display mode of the notification information is detected when the electronic device is in a lockscreen state. The display mode may include displaying privacy information in the notification information, displaying the notification information without private information, not displaying the notification information at all, and the like. The private information may be a name of a sender that sends the notification information as well as details of the notification information, and the like.

In exemplary embodiments, the display mode of the notification information can be set according to a user type of a user to view the notification information. Different display modes may be set for specific users and non-specific users. For instance, the display mode is set to display the private information in the notification information for a specific user and to shield the private information in the notification information for a non-specific user. In some embodiments, the display mode is set to display private information in the notification information for a specific user and not to display the notification information for a non-specific user, e.g., the electronic device does not display any prompt when receiving the notification information in a lockscreen state. The user may also set same display modes for specific users and non-specific users. For instance, the display modes for a specific user and a non-specific user are both to display the private information in the notification information. In some embodiments, the display modes for a specific user and a non-specific user are both to shield the private information in the notification information. One of ordinary skill in the art should know that other display modes may also be employed for the different user types, which will not be described in detail here.

In some embodiments, the electronic device may receive user inputs to set the display modes for different types of notification information. For instance, the user may set different display modes for short messages and instant communication information, respectively.

Referring to FIG. 2A, in step 202, the electronic device, after receiving the notification information in a lockscreen state, detects whether the display modes of the notification information for different user types are different. If the display modes of the notification information for different user types are the same (202—No), the electronic device performs step 206, in which the notification information can be displayed directly under the display mode. If the display modes of the notification information for different user types are different, the electronic device performs step 203.

In step 203, if the display modes of the notification information for different user types are different (202—Yes), a user type of a user to view the notification information is determined.

The electronic device, when detecting that the display modes of the notification information for different user types are different, is configured to determine the user type of the user to view the notification information, so as to determine the display mode of the notification information for the user.

The electronic device may determine the user type of the user to view the notification information in the following two exemplary manners.

First, the electronic device detects whether a wearable device of a specific user exists in a predetermined range, and determines the user type of the user to view the notification information according to the detection result.

In some embodiments, the electronic device may establish a binding relationship with the wearable device of the specific user in advance. For example, the wearable device, such as an electronic wristband, can connect to the electronic device, such as a mobile phone, through a BLE (Bluetooth Low Energy) method. During the connection process, the mobile phone writes a password into a specific attribute of the wristband by the BLE. After receiving the password, the wristband prompts the user to confirm the connection, such as requiring the user to knock the wristband after shaking it, or pressing a certain key. The mobile phone, after receiving the confirmation information, saves a MAC (Media Access Control) address of the wristband and the corresponding password in the confirmation information as binding information.

The electronic device determines that the user to view the notification information is a specific user if the wearable device of the specific user exists in the predetermined range from the electronic device, and determines that the user is a non-specific user if no wearable device of the specific user exists in the predetermined range. The predetermined range may be a threshold distance from the electronic device. For instance, the predetermined range may be within one or two meters from the electronic device.

In some embodiments, the electronic device may determine the distance between the wearable device and the electronic device according to a Bluetooth signal intensity from the wearable device of the specific user. The electronic device may set a signal intensity threshold for detecting whether the wearable device of the specific user exists in the predetermined range. When the Bluetooth signal intensity from the wearable device of the specific user is greater than the signal intensity threshold, it is determined that the wearable device of the specific user exists in the predetermined range. When the Bluetooth signal intensity from the wearable device of the specific user is less than the signal intensity threshold, it is determined that no wearable device of the specific user exists in the predetermined range.

Second, to determine the user type of the user to view the notification information, the electronic device collects first physiological characteristic information of the user using the electronic device, obtains pre-stored second physiological characteristic information of each specific user, compares the first physiological characteristic information with the second physiological characteristic information, and determines the user type of the user to view the notification information according to the comparison result. For example, the physiological characteristic information may be face information, fingerprint information, voice information, and the like.

The electronic device determines that the user to view the notification information is a specific user if the comparison result shows that the first physiological characteristic information matches the second physiological characteristic information; and determines that the user is a non-specific user if the comparison result shows that the first physiological characteristic information does not match the second physiological characteristic information.

For example, when the physiological characteristic information is face information, the electronic device turns on a front camera to acquire the face information of the user that is using the electronic device before displaying the notification information. The electronic device compares the acquired face information with the face information of each specific user pre-stored in the electronic device. If the acquired face information matches the face information of a specific user, the user is determined to be the specific user. But if the acquired face information does not match the pre-stored face information of each specific user, the user is determined to be a non-specific user.

Figure 2B:
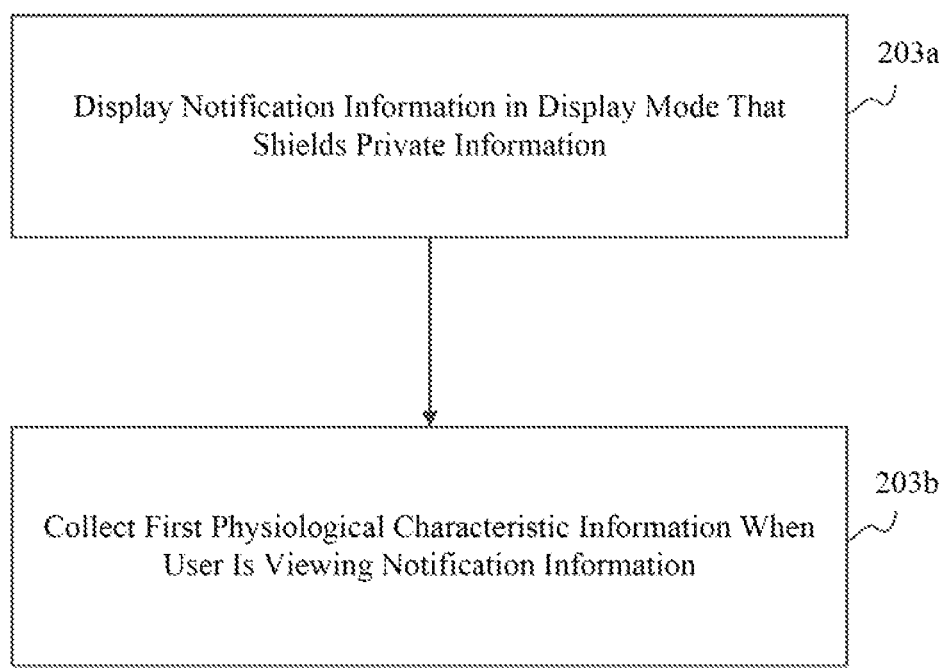
FIG. 2B is a flow chart of a method for collecting first physiological characteristic information of a user, according to an exemplary embodiment.

In some embodiments, the electronic device may collect the first physiological characteristic information of the user who is using the electronic device through the steps as shown in FIG. 2B.

Referring to FIG. 2B, in step 203a, the notification information is displayed in a display mode that shields private information in the notification information.

For example, the electronic device, after receiving the notification information in a lockscreen state, determines to display the notification information by shielding the private information in the notification information.

In step 203b, the first physiological characteristic information is collected when the user views the notification information.

The electronic device may collect the first physiological characteristic information of the user when the user is viewing the notification information. For example, the electronic device may enable the front camera to collect the face information of the user who is viewing the notification information. In some embodiments, the electronic device may collect the fingerprint information of the user through a fingerprint collection device.

Referring back to FIG. 2A, in step 204, when the user type indicates that the user is a specific user, the display mode that displays the private information in the notification information is determined.

For example, after determining the user type of the user to view the notification information, the electronic device determines that the display mode is to display the private information in the notification information when the user type indicates that the user is a specific user. The privacy information may be a name of a sender that sends the notification information, details of the notification information, and the like.

Figure 2C:
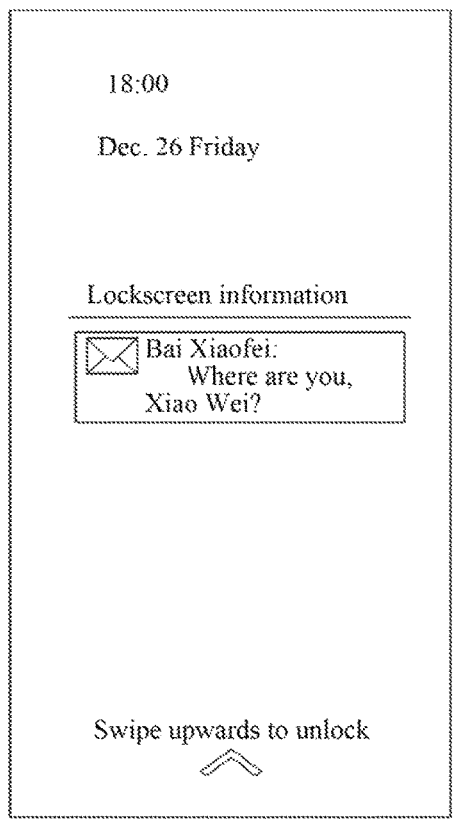
FIG. 2C is a schematic diagram showing a display screen displaying private information in notification information, according to an exemplary embodiment.

FIG. 2C is a schematic diagram showing a display screen displaying private information in the notification information, according to an exemplary embodiment. After receiving the notification information in a lockscreen state and determining that the user to view the notification information is a specific user, the electronic device displays the sender's name, e.g., "Bai Xiaofei," and the detailed content, e.g., "Where are you, Xiao Wei?" of the notification information.

Referring back to FIG. 2A, in step 205, when the user type indicates that the user is a non-specific user, the display mode that shields the private information in the notification information is determined.

For example, after the user type of the user to view the notification information is determined to be a non-specific user, the electronic device determines that the display mode is to shield the private information in the notification information.

Figure 2D:
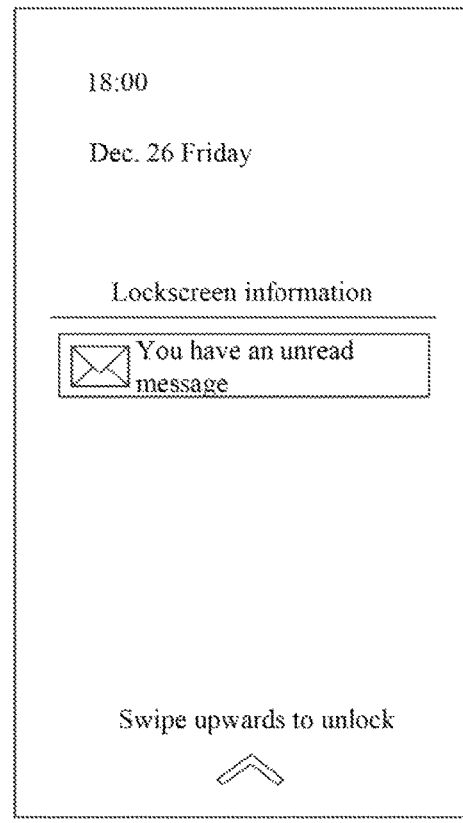
FIG. 2D is a schematic diagram showing a display screen displaying notification information in which private information is shielded, according to an exemplary embodiment.

FIG. 2D is a schematic diagram showing a display screen displaying notification information in which private information is shielded, according to an exemplary embodiment. After receiving the notification information in a lockscreen state and determining that the user who will view the notification information is a non-specific user, the electronic device displays only a notification that reads, e.g., "You have an unread message."

Referring back again to FIG. 2A, in step 206, the notification information is displayed according to the display mode.

After determining the display mode of the notification information, the electronic device, displays the notification information in a lockscreen interface according to the display mode.

By using the method 200, private information in the notification information may be shielded when a non-specific user views the notification information. This protects the private information from being revealed when a non-specific user who is using the electronic device.

Figure 3:
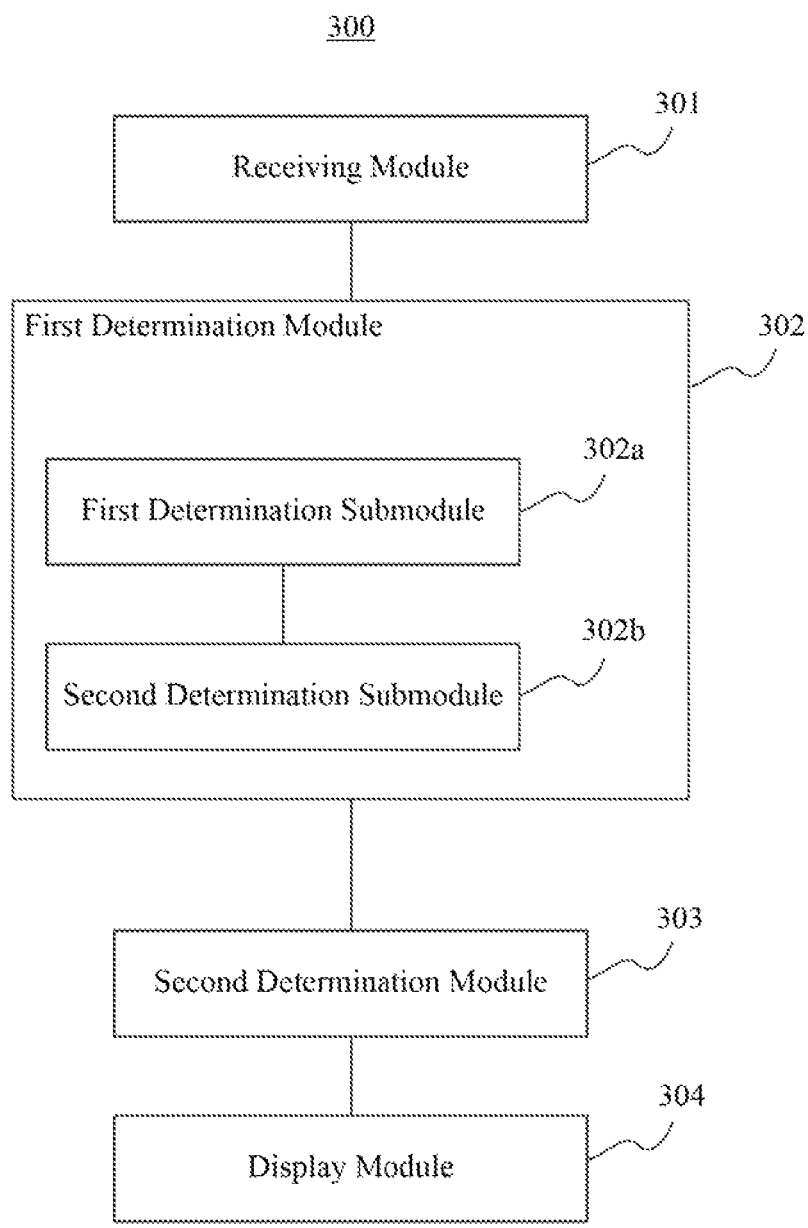
FIG. 3 is a block diagram of a device for displaying notification information, according to an exemplary embodiment.

FIG. 3 is a block diagram of a device 300 for displaying notification information, according to an exemplary embodiment. The device 300 may be an electronic device, such as a smartphone, a tablet, a smart TV, an e-book reader, a multimedia player, a portable laptop computer, a desktop computer, and the like. Referring to FIG. 3, the device 300 may include a receiving module 301, a first determination module 302, a second determination module 303, and a display module 304.

The receiving module 301 is configured to receive notification information in a lockscreen state.

The first determination module 302 is configured to determine a user type of a user to view the notification information received by the receiving module 301.

The second determination module 303 is configured to determine a display mode of the notification information according to the user type determined by the first determination module 302.

The display module 304 is configured to display the notification information according to the display mode determined by the second determination module 303.

In some embodiments, the first determination module 302 may further include a first determination submodule 302a and/or a second determination submodule 302b.

The first determination submodule 302a is configured to detect whether a wearable device of a specific user exists in a predetermined range from the device 300, and determine the user type of the user to view the notification information according to the detection result.

The second determination submodule 302b is configured to collect first physiological characteristic information of a user who is using the electronic device, obtain pre-stored second physiological characteristic information of each specific user, compare the first physiological characteristic information with the second physiological characteristic information, and determine the user type of the user to view the notification information according to the comparison result.

Figure 4:
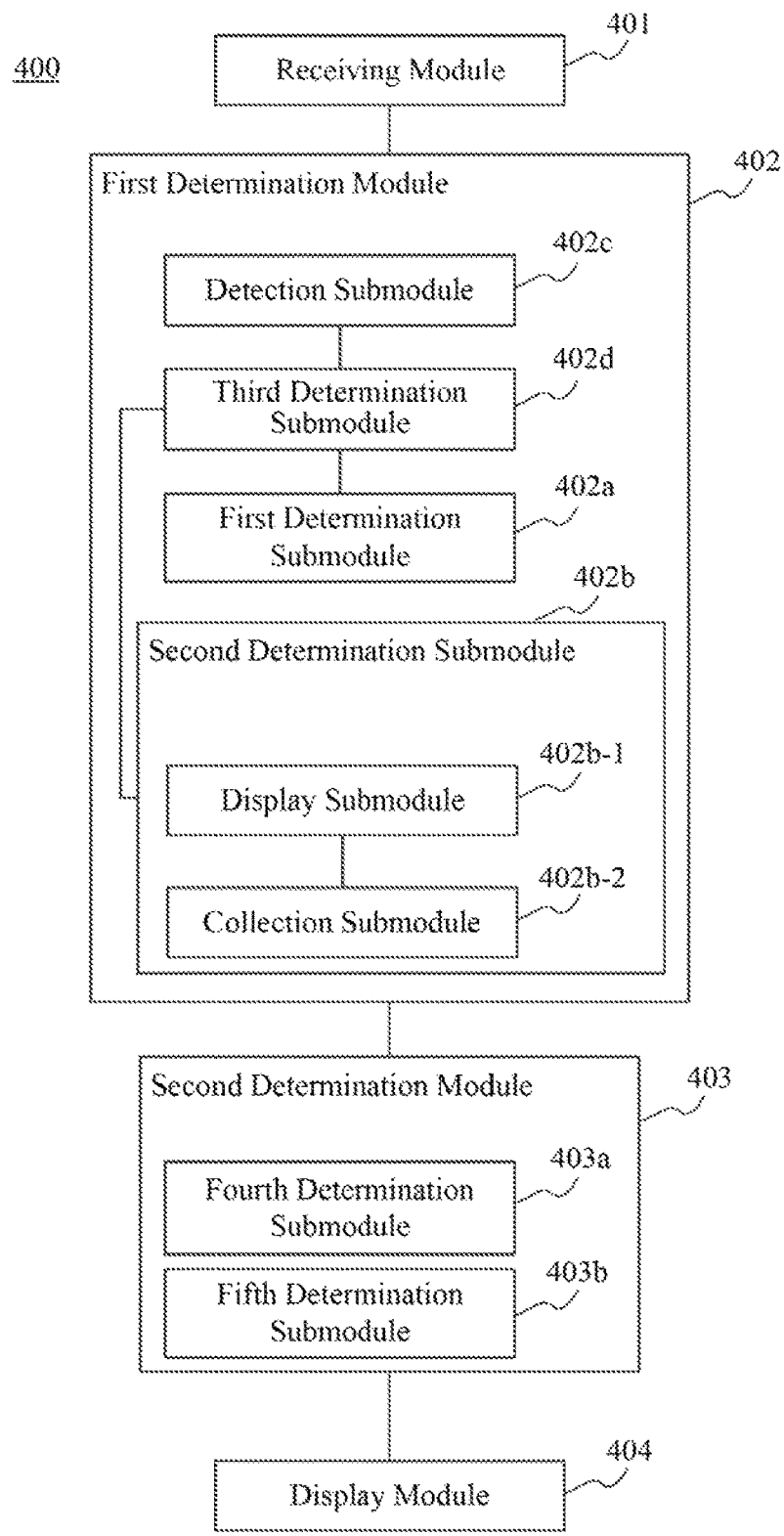
FIG. 4 is a block diagram of device for displaying notification information, according to an exemplary embodiment.

FIG. 4 is a block diagram of a device 400 for displaying notification information, according to an exemplary embodiment. The device 400 can be an electronic device, such as a smartphone, a tablet, a smart TV, an e-book reader, a multimedia player, a portable laptop computer, a desktop computer, and the like. As shown in FIG. 4, the device 400 may include a receiving module 401, a first determination module 402, a second determination module 403, and a display module 404.

The receiving module 401 is configured to receive notification information in a lockscreen state.

The first determination module 402 is configured to determine a user type of a user to view the notification information received by the receiving module 401.

The second determination module 403 is configured to determine a display mode of the notification information according to the user type determined by the first determination module 402.

The display module 404 is configured to display the notification information according to the display mode determined by the second determination module 403.

The first determination module 402 may further include a first determination submodule 402a and/or a second determination submodule 402b.

The first determination submodule 402a is configured to detect whether a wearable device of a specific user exists in a predetermined range from the device 400, and determine the user type of the user to view the notification information according to the detection result.

The second determination submodule 402b is configured to collect first physiological characteristic information of a user who is using the electronic device, obtain pre-stored second physiological characteristic information of each specific user, compare the first physiological characteristic information with the second physiological characteristic information, and determine the user type of the user to view the notification information according to the comparison result.

In some embodiments, referring to FIG. 4, the second determination submodule 402b may further include a display submodule 402b-1 and a collection submodule 402b-2.

The display submodule 402b-1 is configured to display the notification information in a display mode in which private information in the notification information is shielded.

The collection submodule 402b-2 is configured to collect the first physiological characteristic information at the time the user views the notification information displayed by the display submodule 402b-1.

In some embodiments, the first determination module 402 may further include a detection submodule 402c and a third determination submodule 402d.

The detection submodule 402c is configured to detect whether display modes of the notification information are the same for different user types.

The third determination submodule 402d is configured to, when the detection submodule 402c detects that the display modes of the notification information are different for different user types, determine the user type of the user to view the notification information.

In some embodiments, the second determination module 403 may include: a fourth determination submodule 403a and/or a fifth determination submodule 403b.

The fourth determination submodule 403a is configured to, when the user type indicates that the user is a specific user, determine that the display mode is one that displays the private information in the notification information.

The fifth determination submodule 403b is configured to, when the user type indicates that the user is a non-specific user, determine that the display mode is one that shields the private information in the notification information.

With respect to the devices 300 (FIG. 3) and 400 (FIG. 4) in the above embodiments, operations of individual modules therein are also described in detail in the methods 100 (FIG. 1) and 200 (FIG. 2).

Figure 5:
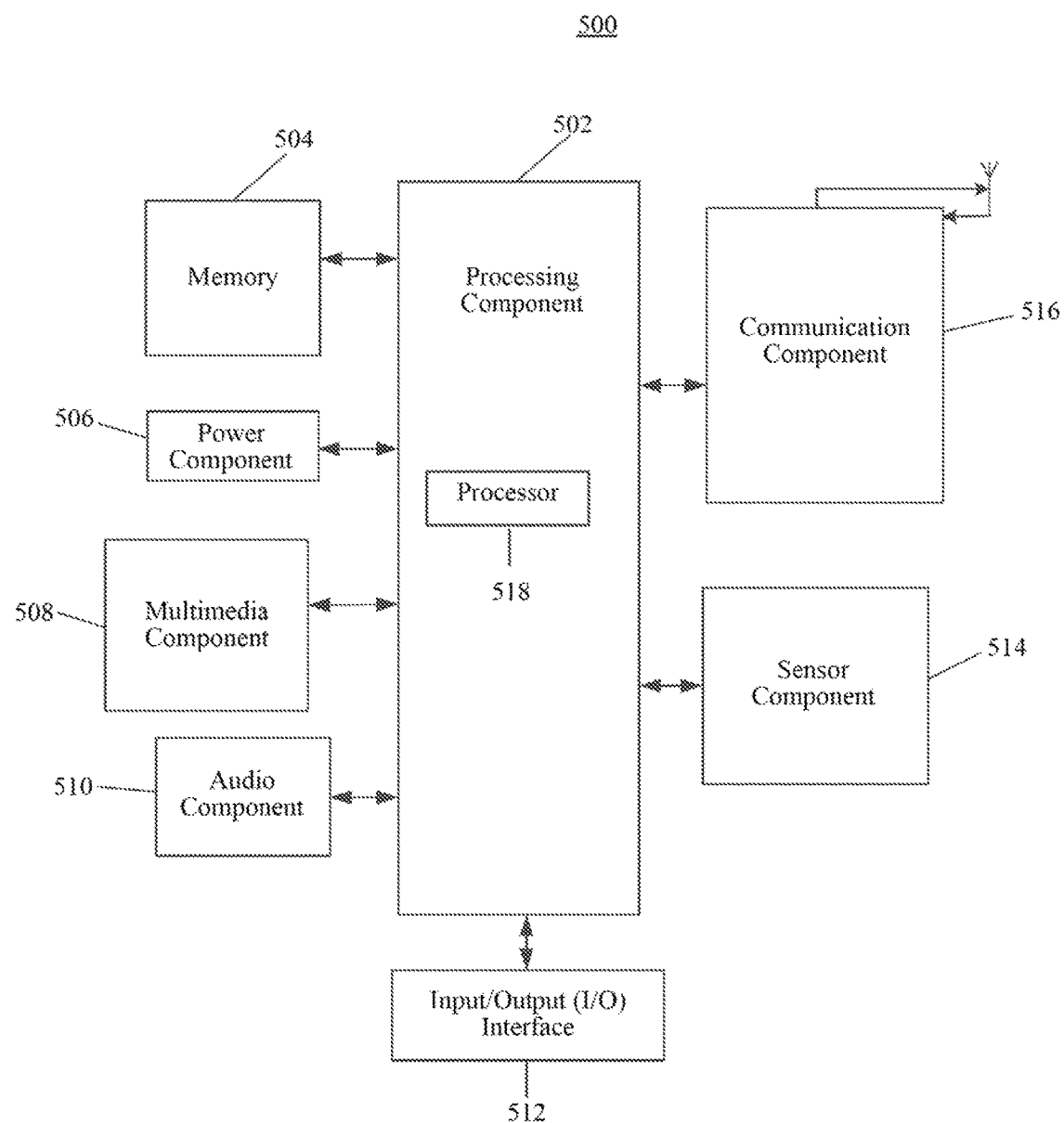
FIG. 5 is a block diagram of a device for displaying notification information, according to an exemplary embodiment.

FIG. 5 is a block diagram of a device 500 for displaying notification information, according to an exemplary embodiment of the present disclosure. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, information, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide state assessments of various aspects of the device 500. For instance, the sensor component 514 may detect an open/closed state of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as Wi-Fi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method for displaying notification information.

In exemplary embodiments, there is also provided a non-transitory computer readable storage medium storing instructions, such as included in the memory 504, executable by the processor 518 in the device 500, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for displaying notification information on an electronic device, comprising:
   receiving notification information in a lockscreen state;
   detecting whether display modes of the notification information are different for different user types, the display modes including at least a mode of shielding private information in the notification information;
   if the display modes of the notification information for different user types are different, determining a user type of a user to view the notification information;
   determining a display mode of the notification information according to the user type; and
   displaying the notification information on the electronic device according to the display mode,
   wherein the determining of the user type of the user comprises:
      detecting whether a wearable device of a specific user exists in a predetermined range from the electronic device; and
      determining the user type of the user according to a detection result, and
   wherein the steps of determining the display mode and displaying the notification information are performed after the step of determining the user type.

2. The method according to claim 1, wherein the user type of the user indicates one of a specific user having the authority to view private information or a non-specific user having no authority to view private information, and the determining of the display mode of the notification information according to the user type comprises:
   when the user type indicates a specific user, determining the display mode to be displaying the private information in the notification information; and
   when the user type indicates a non-specific user, determining the display mode to be shielding the private information in the notification information.

3. A device for displaying notification information, comprising:
   a processor; and
   a memory for storing instructions executable by the processor;
   wherein the processor is configured to:
      receive notification information when the device is in a lockscreen state;
      detect whether display modes of the notification information are different for different user types, the display modes including at least a mode of shielding private information in the notification information;
      if the display modes of the notification information for different user types are different, determine a user type of a user to view the notification information;
      determine a display mode of the notification information according to the user type; and
      display the notification information on the device according to the display mode,
   wherein the processor is further configured to:
      detect whether a wearable device of a specific user exists in a predetermined range from the device; and
      determine the user type of the user according to a detection result, and
   wherein the processor is further configured to determine the display mode and display the notification information after determining the user type.

4. The device according to claim 3, wherein the user type of the user indicates one of a specific user having the authority to view private information and a non-specific user having no authority to view private information; and the processor is further configured to:
   when the user type indicates a specific user, determine the display mode to be displaying the private information in the notification information; and
   when the user type indicates a non-specific user, determine the display mode to be shielding the private information in the notification information.

5. A non-transitory computer-readable storage medium storing instructions which, when executed by a processor of an electronic device, cause the electronic device to perform:
   receiving notification information in a lockscreen state;
   detecting whether display modes of the notification information are different for different user types, the display modes including at least a mode of shielding private information in the notification information;
   if the display modes of the notification information for different user types are different, determining a user type of a user to view the notification information;
   determining a display mode of the notification information according to the user type; and
   displaying the notification information on the electronic device according to the display mode,
   wherein the determining of the user type of the user comprises:
      detecting whether a wearable device of a specific user exists in a predetermined range from the electronic device; and
      determining the user type of the user according to a detection result, and
   wherein the steps of determining the display mode and displaying the notification information are performed after the step of determining the user type.

* * * * *